United States Patent

[11] 3,607,050

| [72] | Inventor | Pierre Chabardes<br>Lyon, France |
|---|---|---|
| [21] | Appl. No. | 725,479 |
| [22] | Filed | Apr. 30, 1968 |
| [45] | Patented | Sept. 21, 1971 |
| [73] | Assignee | Rhone-Poulenc S.A.<br>Paris, France |
| [32] | Priority | May 24, 1967 |
| [33] | | France |
| [31] | | 107,665 |

[54] PROCESS FOR THE PREPARATION OF THE TRIMER OF RUTHENIUM TETRACARBONYL
4 Claims, No Drawings

[52] U.S. Cl............................................................. 23/203 C

[51] Int. Cl............................................................. C01g 1/04, C01g 55/00
[50] Field of Search........................................... 23/203 C

[56] References Cited
UNITED STATES PATENTS
3,387,932  6/1968  Pino et al.................... 23/203

*Primary Examiner*—Earl C. Thomas
*Attorney*—Cushman, Darby & Cushman

ABSTRACT: The trimer of ruthenium tetracarbonyl, a catalyst of proved utility, is made by heating carbon monoxide at atmospheric pressure with a tris-($\beta$-dionato)ruthenium or carbonyl derivative thereof in an alcohol boiling at 100° to 250° C.

PROCESS FOR THE PREPARATION OF THE TRIMER OF RUTHENIUM TETRACARBONYL

The present invention relates to the production of the trimer of ruthenium tetracabonyl.

Manchot et al. [Zeitschrift fuer anorganische und allgemeine Chemie 226, 385 (1936)] have prepared, by thermal decomposition of ruthenium pentacarbonyl, an orange-yellow product to which Corey et al. [J. Amer. Chem. Soc. 83, 2,203 (1961)] have attributed the formula [Ru(CO)$_4$]$_3$. This compound, which can be employed as catalyst for numerous organic chemical reactions, such as REPPE syntheses, hydroformylations and carbonylations, has hitherto been prepared by various methods involving the action of carbon monoxide at elevated pressure on an organic or mineral derivative of ruthenium, in the presence of hydrogen or of a hydrogen donor compound. Thus, it has been proposed (see French Pat. No. 1,381,091) to prepare the trimer of ruthenium tetracarbonyl by reacting a mixture of carbon monoxide and hydrogen with a ruthenium salt of carboxylic acid or a tris-($\beta$-dionato)ruthenium at a temperature between 100° and 250° C. and under a pressure of 50 to 350 atmospheres, in an organic solvent such as a hydrocarbon, a ketone or an aliphatic alcohol. It was subsequently proposed (see Addition No. 88,673 to French Pat. No. 1,381,091) to effect the reaction in the presence of a hydrogen donor such as an alcohol or a methyl ketone, and in the absence of gaseous hydrogen. However, the process remains dependent upon the use of high pressures. Jamieson et al. (Chem. Comm. 1966, page 569) have proposed to prepare the trimer of ruthenium tetracarbonyl by the action of a mixture of carbon monoxide and hydrogen under a pressure of 1,200 atmospheres on a ruthenium trichloride solution in the presence of silver as chlorine acceptor.

It has now been found, and this forms the subject of the present invention, that it is possible to obtain the trimer of ruthenium tetracarbonyl by reacting carbon monoxide with a tris-($\beta$-dionato)ruthenium or a carbonyl derivative thereof, at atmospheric pressure, if the operation is carried out at a temperature between 100° and 250° C., and preferably between 120° and 160° C., in an alcohol having a boiling point between 100° and 250° C.

Particularly suitable alcohols for carrying out the new process are benzyl alcohol, the $\alpha$- and $\beta$-phenylethyl alcohols, diethylene-glycol, cyclohexylethyl alcohol and hexahydrocumic alcohol, Of the tris-($\beta$-dionato)ruthenium derivatives which may be employed in the present process, there may be mentioned those derived from acetylacetone, 1,1,1-trifluoroacetylacetone, hexane-2,4-dione, heptane-2,4-dione, benzoyl acetone, dibenzoyl methane and cyclohexane-1,3-dione, or in general any $\beta$-diketone of formula:

$$R^1—CO—CH_2—CO—R^2$$

where $R^1$ and $R^2$ are each alkyl or halogeno-substituted alkyl of one to four carbon atoms, which may be linked to form a five- or six-membered ring or phenyl. As carbonyl derivatives of tris-($\beta$-dionato)ruthenium, there may be used compounds of the formula [($\beta$-dionato)$_2$(CO)Ru]$_2$, which may be prepared by heating between 20° and 200° C. a mixture of a carbonyl group donor compound such as an alcohol (methanol, ethanol, methoxyethanol, ethylene-glycol, triethylene-glycol, allyl alcohol or benzyl alcohol), an amide, an aldehyde, or an acid chloride, with a tris-($\beta$-dionato)ruthenium, such as one of those just mentioned.

The concentration of the $\beta$-dionatoruthenium in the alcohol employed may vary within wide limits. However, it is preferably to operate in the neighborhood of saturation of the alcohol with the $\beta$-dionatoruthenium.

The process according to the invention is particularly easy to carry out. Generally speaking it is sufficient to pass a current of carbon monoxide through the heated alcoholic $\beta$-dionatoruthenium solution.

The following examples illustrate the invention.

EXAMPLE 1

After purging with nitrogen, 2.4 g. of tris-(acetylacetonato)ruthenium and 40 cc. of benzyl alcohol are introduced into a 100-cc. round-bottomed flask provided with a dipping gas-admission tube, a stirring device and a condenser cooled with dry ice. The apparatus is purged with a current of carbon monoxide, the temperature of the contents of the flask is raised to 140°–150° C. with stirring, and carbon monoxide is bubbled through the reaction mass for 6 hours. The solution changes successively from red to orange and then to orange-red. On cooling to ambient temperature, orange crystals are obtained. After cooling to −10° C., the contents of the flask are filtered through fritted glass. The precipitate is washed on a filter with 5 cc. of cold methanol and then dried in vacuo. In this way, 884 mg. of product are obtained. The filtrate is distilled under reduced pressure (0.2 mm. Hg.) to a temperature of 140° C. in the mass. On cooling to −10° C., a precipitate is obtained which is separated by filtration and washed on a filter with methanol. After drying, 59 mg. of orange product are obtained. In all, 943 mg. of product is recovered. The percentage analysis and the infrared spectrum of the product indicate that it is the compound of formula: [Ru(CO)$_4$]$_3$ 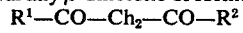 The yield is 73.5 percent.

EXAMPLE 2

Into the apparatus employed in example 1, 1.2 g. of tris-(acetylacetonato)ruthenium and 20 cc. of $\beta$-phenylethyl alcohol are introduced. The procedure of example 1 is then followed. 392 mg. of ruthenium tetracarbonyl trimer, i.e. a yield of 61 percent, are obtained.

EXAMPLE 3

600 mg. of tris-(acetylacetonato)ruthenium and 20 cc. of diethylene-glycol are introduced into an apparatus identical with that described in example 1, except that the round-bottomed flask has a capacity of 50 cc., under the conditions described in example 1. The contents of the flask are raised to 145° C. for 4 hours 30 minutes while carbon monoxide is bubbled through the reaction mass. The solution turns red and precipitation of ruthenium is observed. At the end of the reaction, the solution is cooled to 0° C. and the precipitate obtained is filtered off and dissolved in 10 cc. of acetone. The solution is filtered to separate the insoluble matter and the acetone is evaporated. In this way, 49.8 mg. of ruthenium tetracarbonyl trimer are obtained. The yield is 15.5 percent.

EXAMPLE 4

200 mg. of the compound of formula [(C$_5$H$_7$O$_2$)$_2$(CO)Ru]$_2$ and 20 cc. of benzyl alcohol are introduced into the apparatus employed in example 3. Carbon monoxide is bubbled for 6 hours through the mass heated to 145° C. 66.7 mg. of ruthenium tetracarbonyl trimer are recovered by the procedure of example 1. The yield is 51 percent.

The compound of formula [(C$_5$H$_7$O$_2$)$_2$(CO)Ru]$_2$ is prepared as follows. 10 g. of ruthenium acetylacetonate and 300 cc. of diethyleneglycol are introduced into a 500-cc. round-bottomed flask provided with a stirring system, a reflux condenser and a nitrogen inlet. On stirring, a red suspension is obtained which is heated at 145°–150° C. in a nitrogen atmosphere. This product dissolves and the solution formed, which is at first dark red, gradually turns orange and then greenish-yellow. After heating for 2 hours, the product is cooled, filtered and then concentrated by distillation under reduced pressure (0.1 mm. Hg.). When the temperature reaches 120° C. in the flask, the distillation is stopped. The residue obtained is then washed with 40 cc. of dichloroethane. In this way, 6.17 g. of greenish-yellow product are obtained. The dichloroethane used in the washing is distilled in vacuo. 4.76 g. of dry residue are recovered, which is added to the product previously obtained. The whole is dissolved in chloroform (450 cc.) and the orange-yellow solution obtained is filtered through silica gel and the solvent is then evaporated to dryness. 9.2 g. of solid yellow product are obtained. After washing with 15 cc. of methanol and then with 10 cc. of pentane, 7 g. of yellow product are obtained, of which the percentage analysis, the infrared spectrum and the mass spectrum correspond to those of the compound of the formula:

$$[(C_5H_7O_2)_2(CO)Ru]_2$$

EXAMPLE 5

201.6 mg. of tris-(1,1,1-trifluoroacetylacetonato)ruthenium and 10 cc. of benzyl alcohol are introduced into the apparatus employed in example 4, and carbon monoxide is then bubbled for 1 hour 35 minutes through the mass, which is heated at 145° C. A metallic ruthenium precipitate is formed. The contents of the flask are cooled to 0° C. and filtered through fritted glass. The whole of the precipitate is treated with acetone, and part dissolves. The insoluble metallic ruthenium is separated by filtration and the filtrate is then evaporated. A solid is obtained, which is dried. In this way, 22.8 mg. of ruthenium tetracarbonyl trimer are collected. The yield is 30 percent.

EXAMPLE 6

A series of experiments are carried out by the procedure of example 1, replacing β-phenylethyl alcohol successively by α-phenylethyl alcohol, cyclohexylethyl alcohol and hexahydrocumic alcohol. The ruthenium tetracarbonyl trimer is obtained in yields of 44.5 percent, 35.5 percent and 61 percent respectively.

I claim:

1. Process for the preparation of the trimer of ruthenium tetracarbonyl which comprises heating a tris-β-dianoto)ruthenium derived from a β-diketone of formula:

$$R^1—CO—CH_2—CO—R^2$$

where $R^1$ and $R^2$ are each alkyl or halogeno-substituted alkyl of one to four carbon atoms, which may be linked to form a five- or six-membered ring, a phenyl, or a carbonyl derivative of ruthenium of the formula $[β\text{-dionato})_2(CO)Ru]_2$ derived from a said β-diketone, in contact with carbon monoxide to between 100° and 250° C. at normal pressure in benzyl alcohol, α- or β-phenylethyl alcohol, diethylene-glycol, cyclohexylethyl alcohol, or hexahydrocumic alcohol.

2. Process according to claim 1, wherein the temperature is between 120° and 160° C.

3. Process according to claim 1, wherein the tris-(β-dionato)ruthenium is tris-(acetylacetonato)ruthenium or tris-(1,1,1-trifluoroacetylacetonato)ruthenium.

4. Process according to claim 1 wherein the carbonyl derivative of tris-(β-dionato)ruthenium is the complex of the formula $[(C_5H_7O_2)_2(CO)Ru]_2$.